United States Patent
Bundo

[11] Patent Number: 5,383,627
[45] Date of Patent: Jan. 24, 1995

[54] OMNIDIRECTIONAL PROPELLING TYPE AIRSHIP

[76] Inventor: Mutsuro Bundo, 6-11, Funai-cho 1-chome, Oita, Japan

[21] Appl. No.: 108,505
[22] Filed: Aug. 18, 1993

[30] Foreign Application Priority Data

Aug. 20, 1992 [JP] Japan ................... 4-221446

[51] Int. Cl.⁶ .............................................. B64B 1/34
[52] U.S. Cl. ........................................ 244/26; 244/25; 244/30; 244/56
[58] Field of Search ............ 244/26, 25, 29, 30, 244/56, 66, 125, 128

[56] References Cited

U.S. PATENT DOCUMENTS

| | | | |
|---|---|---|---|
| 1,033,186 | 7/1912 | Merckens | 244/25 |
| 1,578,069 | 3/1926 | Broyles | 244/56 |
| 1,587,895 | 6/1926 | Broyles | 244/25 |
| 1,827,771 | 10/1931 | Williams | 244/26 |
| 3,180,588 | 4/1965 | Fitzpatrick | 244/25 |
| 3,288,397 | 11/1966 | Fitzpatrick | 244/29 |
| 6,096,141 | 3/1992 | Schley | 244/25 |

FOREIGN PATENT DOCUMENTS

| | | |
|---|---|---|
| 613449 | 11/1926 | France. |
| 2612878 | 9/1988 | France. |
| 26897 | 1/1915 | United Kingdom ........ 244/66 |
| 997679 | 7/1965 | United Kingdom. |
| 84/01547 | 4/1984 | WIPO. |

Primary Examiner—Michael S. Huppert
Assistant Examiner—Anne E. Bidwell
Attorney, Agent, or Firm—Wenderoth, Lind & Ponack

[57] ABSTRACT

An omnidirectional propelling type of airship can be propelled in any direction in three-dimensions. The airship includes an airtight gas chamber, gas having a specific gravity smaller than that of air and filling the gas chamber, a section capable of accommodating men, cargo and the like, and propellers supported by gimbals and capable of propelling the airship in any spacial direction.

3 Claims, 3 Drawing Sheets

OMNIDIRECTIONAL PROPELLING TYPE AIRSHIP

BACKGROUND OF THE INVENTION

1. Field of the Invention

The present invention relates to an airship which can be propelled in any desired direction including front-rear, upper-lower and left-right directions.

2. Description of the Prior Art

Airships in the prior art include a gas chamber filled with gas having a specific gravity less than that of air and horizontal propelling means. Although airships additionally provided with vertical propelling means have been proposed, they have no yet been put to practical use.

These airships in the prior art mainly perform forward flight, as it is very difficult for them to ascend, descend and retreat. Even airships provided with vertical propelling means encounter difficulties in changing direction, for instance, from forward to upward movement because one of the propelling means must be stopped while the other propelling means is started.

In order to resolve these problems of the airships in the prior art, the present inventor previously proposed airships provided with erecting/laying type of propelling means, which can propel the aircraft in various directions including front-rear and upper-lower directions, in Japanese Patent Application No. 62-156478 (1987), for example.

While the proposed airships have remarkable merit in that the propelling direction can be chosen over the entire range within a plane in which the front-rear and upper-lower directions lie as viewed in the direction of flight, there still remains room for improvement because movement in the left and right directions cannot be effected only by the erecting/laying type of propelling means.

Further, the above-described airships in the prior art are subject to the following problems.

That is, among the airships in the prior art, those having propelling means for separately propelling the airship in the horizontal and vertical directions, respectively, with respect to the axis of the airship, are subject to the problem in that it is necessary to stop or start the respective propelling means each time the propelling direction is to be changed and so landing the airship in a narrow place is extremely difficult.

While the airships provided with the erecting/laying type of propelling means, which can select the propelling direction over the entire range within a plane including the front-rear and upper-lower directions with respect to the axis of the airship, exhibit improved take-off and landing performances, the ability of the airship to make fine movements in the left and right directions needs to be improved.

SUMMARY OF THE INVENTION

An object of the present invention is to resolve the above-mentioned problems in the prior art.

That is, it is one object of the present invention to provide an omnidirectional propelling type of airship provided with propelling means which can propel the airship in any desired direction in three dimensions including front-rear, upper-lower and left-right directions.

According to the present invention, there is provided an omnidirectional propelling type of airship comprising a gas chamber capable of tightly sealing gas therein, gas having a specific gravity smaller than that of air and filling the gas chamber, a section (cabin) capable of accommodating people, cargo and the like, and propelling means supported by a gimbal and capable of propelling the airship in any spacial direction.

Due to the above-mentioned structural features, the following advantages can be obtained.

That is, since the airship includes a gas chamber filled with gas having a specific gravity smaller than that of air and a section which can accommodate men, cargo and the like, the airship can float in the air while carrying men, cargo and the like without using airfoils for generating lift or propelling means.

Furthermore, since the airship comprises propelling means supported by a gimbal and capable of propelling the airship in any spacial direction, the entire airship can be moved over the entire range defined by front-rear, upper-lower and left-right directions.

Moreover, since the direction in which the airship is propelled can be changed by manipulating a single one of the propelling means, the change in direction of the airship can be achieved quickly.

The above-mentioned and other objects, features and advantages of the present invention will become more apparent by referring to the following description of one preferred embodiment of the invention taken in conjunction with the accompanying drawings.

DETAILED DESCRIPTION OF THE PREFERRED EMBODIMENT

The present invention will now be described in greater detail in connection with one preferred embodiment of the invention illustrated in FIGS. 1 to 4.

Figure 1:
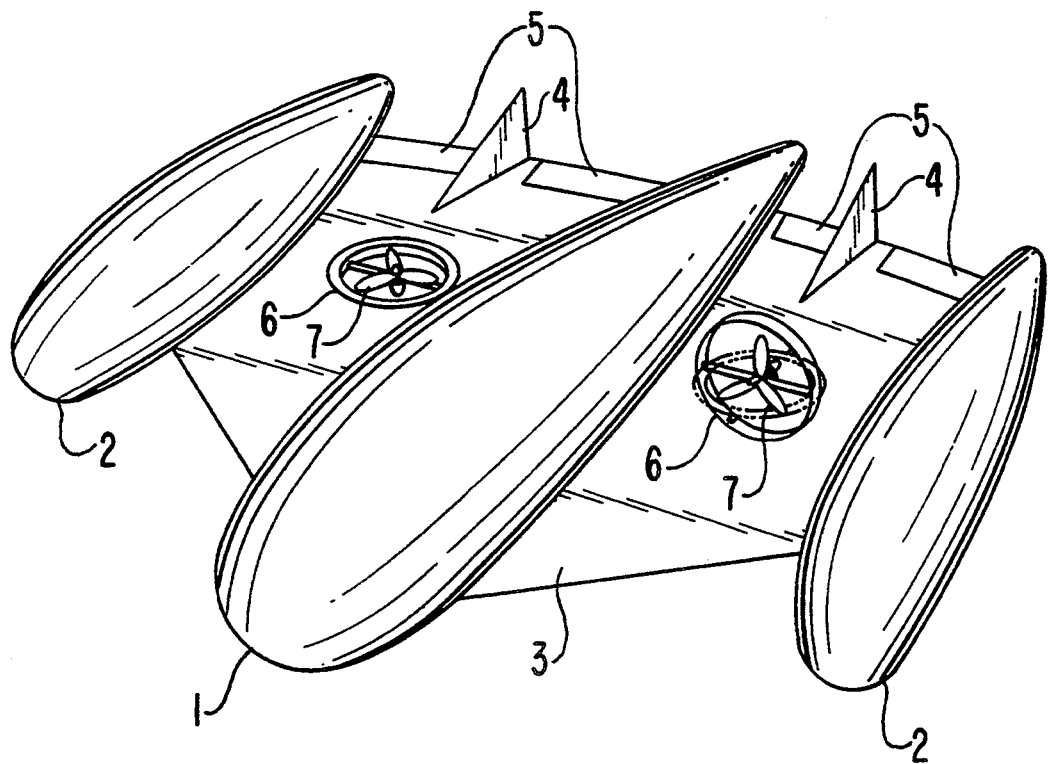
FIG. 1 is a perspective view of one embodiment of an omnidirectional propelling type of airship according to the present invention.
Figure 2:
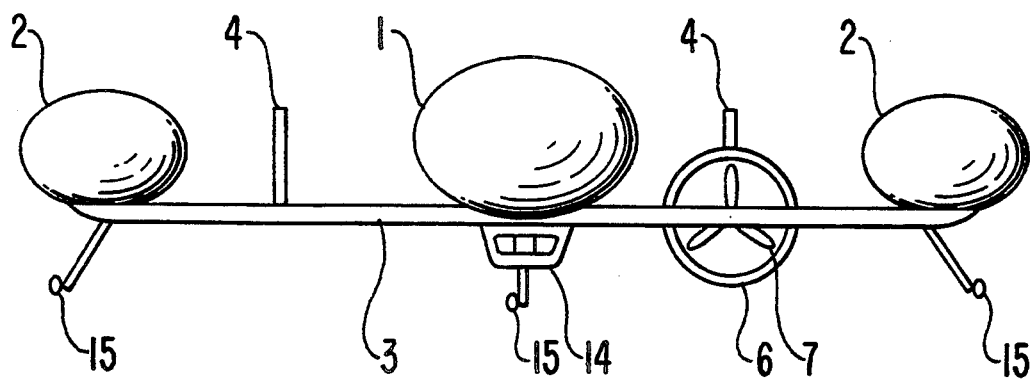
FIG. 2 is a front view of the same airship.
Figure 3:
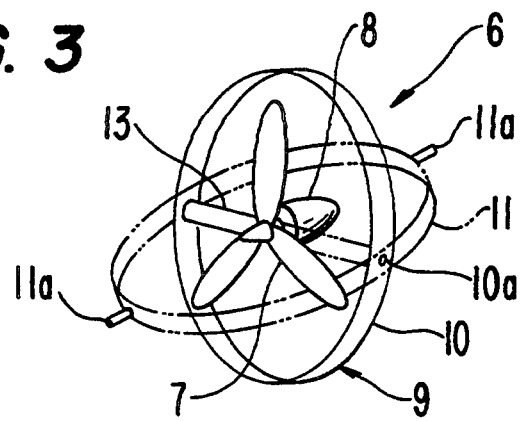
FIG. 3 is an enlarged schematic view of a propelling device on the side of the airship shown in FIG. 1.
Figure 4A:
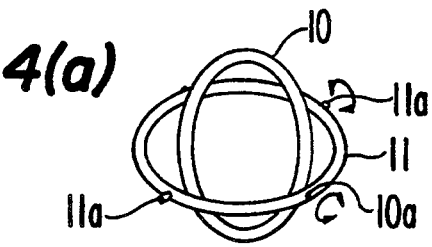
FIGS. 4(a)–4(c) are perspective views of the propelling device showing relative positions between an inner frame and an outer frame of a gimbal, with FIG. 4(a) showing a state in which the inner frame is perpendicular to the outer frame, FIG. 4(b) showing a state in which the inner frame is positioned along the outer frame, and FIG. 4(c) showing a state in which the inner frame is inclined with respect to the outer frame.
Figure 4B:
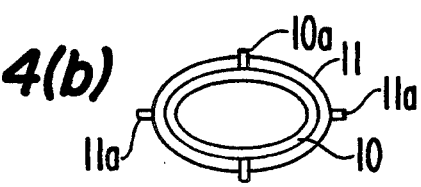
Figure 4C:
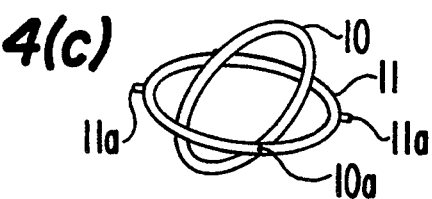

Among these figures, FIG. 1 is a perspective view of the omnidirectional propelling type of airship as seen from the front-upper direction, FIG. 2 is a front view of the same preferred embodiment, FIG. 3 is an enlarged view of a propelling device 6 on the port side of the airship shown in FIG. 1, and FIGS. 4(a)–4(c) are schematic perspective views of the propelling device 6 showing relative positions between an inner frame 10 and an outer frame 11 of a gimbal 9 of the propelling device 6. A state in which the inner frame 10 is perpendicular to the outer frame 11, that is, with a propeller 7 held in a direction at which the propeller will induce horizontal flight and is aligned with the axis of the airship, is shown in FIG. 4(a); the state in which the inner frame 10 is positioned along the outer frame 11 is shown in FIG. 4(b); and the state in which the inner frame 10 is inclined with respect to the outer frame 11 is shown in FIG. 4(c).

In FIGS. 1 and 2, reference numeral 1 designates a middle fuselage having a tear drop shape oriented in the direction of flight to reduce wind resistance, and inside of which is provided a skeleton of an appropriate lightweight material connected to horizontal airfoils 3. The middle fuselage also includes a cabin 14 and the like as will be described later, and an outer shell of cloths of plastic fibers treated with a weather-resistance oil-proof rubber-group paint so as to form an airtight gas chamber. It is to be noted that portions of the fuselage penetrated by metallic members are provided with necessary seals to prevent gas from leaking from the gas chamber.

Reference numeral 2 designates outer fuselages provided on the left and right sides of the middle fuselage 1 with appropriate intervals kept therebetween and also forming the gas chamber of the airship. Although these fuselages 2 are smaller than the middle fuselage 1, their shape and structure are nearly the same as those of the middle fuselage 1. That is, the fuselages 2 have a similar tear-drop shape, have an inner structure including a lightweight skeleton contiguous to the horizontal airfoils 3, and have an outer shell made of the same material as the middle fuselage 1. However, since the outer fuselages 2 employ helium gas at the same pressure as the middle fuselage 1, a tensile strength of the outer shell of the outer fuselages 2 which depends upon its diameter can be smaller than that of the middle fuselage 1 and therefore, for the purpose of keeping the airship lightweight, an outer shell somewhat thinner than that of the middle fuselage is employed.

The horizontal airfoils 3 connecting the middle fuselage 1 with the outer fuselages 2 generate the lift, and as a matter of course, also contribute to the rolling stability of the airship. For the purpose of maximizing lift and exhibiting a sufficient strength, a delta-shaped airfoil is employed. The airfoil cross sections taken in the direction of flight have a common shape. Thus, according to Bernoulli's law, air will flow along its upper surface at a high velocity and low pressure, while air will flow along its lower surface at a low velocity and high pressure (normal pressure). A plurality of airfoil-shaped ribs made of a light metal are covered by thin plates (outer shells) of high-strength aluminum and are appropriately riveted. Reference numeral 4 designates left and right tails extending vertically at the rear portion of the horizontal airfoils 3, and numeral 5 designates elevators provided along the rear edge of the horizontal airfoils 3. The left and right propelling devices 6 are provided in holes in the horizontal airfoils 3 at positions close to a laterally extending straight line extending through the interval between a center of gravity of the entire hull and a center of aerodynamic forces set behind the center of gravity. In FIGS. 1 and 2, the propeller 7 of the propelling device 6 on the port side is shown as oriented in the direction of flight, while the other propeller 7 on the starboard side is shown as directed upwards.

In order that the propeller 7 can be directed in any direction in three dimensions, the propeller 7 and an engine 8 for rotating the propeller 7 are supported via a gimbal 9 of the propelling device 6.

More particularly, with reference to FIG. 3, an inner frame 10 and an outer frame 11 of the gimbal 9 are supported so as to be rotatable with respect to each other about orthogonal axes passing through the center of the propelling device 6. The inner frame 10 supports the propeller 7 and the engine 8 at its center via a beam 13 and is itself rotatably supported by the outer frame 11 via two left and right inner shafts 10a which extend in directions perpendicular to the direction of the flight. One of the inner shafts 10a is hidden from view in FIG. 3 behind the inner frame 10 and the back of the beam 13. The outer frame 11 is rotatably supported by the horizontal airfoil 3 via front and rear outer shafts 11a extending horizontally from the outer periphery of the horizontal airfoil 3. In other words, the propeller 7 and the engine 8 are not constrained by the orientation and inclination of the hull and are thus supported by the horizontal airfoil 3 in a manner similar to a compass in a gyrocompass. The beam 13 that extends in the inner frame 10 passes through the center of a circle coincident with the inner frame and has opposite ends fixedly secured to the inner frame 10. The propeller 7 and the engine 8 are rotatably supported at the center of beam 13.

Although not shown, one inner shaft 10a is directly connected to an output shaft of a low-speed large-torque irreversible servo motor fixedly secured to the outer frame 11. Hence, the inner shaft 10a can be rotated over various angles and can be stopped (controlled) by a pilot but it will not rotate in response to a reactive torque transmitted from the inner frame 10 and the propeller 7. Likewise, an outer shaft 11a is also directly connected to an output shaft of an irreversible servo motor fixedly secured to the horizontal airfoil 3. Accordingly, a notch for accommodating the irreversible servo motor fixedly secured to the outer frame 11 is provided in the horizontal airfoil 3, but for the purpose of simplifying the drawings, the notch is not shown.

In addition, the respective irreversible servo motors for the inner shaft 10a and the outer shaft 11a can be jointly controlled. For instance, in order to turn the propeller 7 directed forwards (the state shown in FIG. 3) 45° to the left with respect to the forward direction, it is necessary to rotate the inner shaft 10a by 45° and the outer shaft 11a 90° to place the outer frame 11 in a vertical attitude. With joint control these rotations can be achieved simultaneously in response to a one-shot manipulation of a control stick. Moreover, a computer and various sensors for detecting environmental conditions such as airspeed, wind direction and the like are operatively associated to compensate for external disturbances such as, for instance, the influence of a crosswind dependent upon a distance between the center of gravity and the center of aerodynamic forces. Accordingly, when the airship is to be turned to the same horizontal 45°-inclined direction, the rates of rotation of the respective irreversible servo motors for the inner shaft 10a and the outer shaft 11a would be controlled depending upon the attitude of the airship hull, the crosswind, the wind velocity and the like.

Incidentally, reference numeral 15 designates wheels along which the airship moves when on land.

On the front side of the cabin 14 is a control chamber provided with a high-pressure helium tank, a high-pressure gas pump and other necessary equipment for use by the passengers and pilot in the case of an emergency. Before flight, helium gas is fed from the helium tank through pipings to inflate the middle fuselage 1 and the outer fuselages 2, whereby their buoyancy is made close to their own weight. On the contrary after landing, the helium gas in the middle fuselage 1 and the outer fuselages 2 is sucked into the helium tank under a high pressure by the high-pressure gas pump.

The pressure of the helium inflating the middle fuselage 1 and the outer fuselages 2 is sufficient to expand the outer shell, i.e. is equal to or higher than the atmospheric pressure, whereas the pressure in the helium tank naturally becomes high because a large volume of helium gas withdrawn from the middle fuselage 1 and the outer fuselages 2 is stored within the comparatively small volume of the tank. However, it is unnecessary to accommodate all of the helium gas within the middle fuselage 1 and the outer fuselages 2 in the helium tank. Rather, it is only necessary that the helium gas be pumped into the helium tank to such an extent that the buoyancy of the airship becomes less than the weight of the hull, the outer shell is not subjected to tensile fatigue or creep, and the helium gas will not leak from the tank due to its high pressure.

Next, the operation of the airship will be described.

In order to take off, at first helium gas from the helium tank is fed into the middle fuselage 1 and the outer fuselages 2, and when the buoyancy has become close to the weight of the hull, the propelling devices 6 are powered up.

Under a normal condition, the propellers 7 of the two propelling devices 6 are directed upwards as shown by the propelling device on the port side of the airship in FIG. 1, and therefore, the airship ascends while in the attitude shown in FIG. 1. At that time, since the propelling devices 6 are located between the center of gravity of the hull and the center of aerodynamic forces (as viewed from the side), the moment about the center of gravity (downwards) located to the front of a vertical line passing through the propeller 7 and the moment about the center of aerodynamic forces (downwards) located aft of the vertical line are mutually offset, and so, the airship does not tilt in the front-rear direction.

When the airship has reached a desired height, the propellers 7 are directed forwards, and the airship advances. As a matter of course, the ascension could be carried out simultaneously with the advancement of the airship by directing the propellers 7 in an obliquely forward-upward direction. In the case where it is desired to turn to the right, once the propeller 7 on the starboard side is made to induce no propelling force by setting its pitch to zero and the propeller 7 on the port side is directed forwards, the propeller 7 on the starboard side could be directed backwards and the propeller 7 on the port side could be directed forwards to quickly turn the airship. In the case of leftward turning, operations reverse to the above are effected. In the case where it is desired to move in the obliquely leftward-downward direction, both the left and right propellers 7 are directed in the obliquely leftward-downward direction. In this connection, the outer frame 11 is oriented obliquely with the inner frame 10 kept flush with the outer frame 11 in the same plane. In the case where is it desired to descend and retreat in the obliquely leftward-downward-backward direction, starting from the just-described state, the inner frame 10 is rotated a little backwards whereby the propeller 7 is directed in the obliquely leftward-downward-backward direction.

According to the present invention, the propellers can be directed in any direction in three dimensions, and the hull can thus be moved in any direction. In addition, by directing the left and right propellers 7 in opposite directions to each other, turning, rolling and a combination thereof can be carried out. Except during turning and rolling, the attitude of the airship almost never varies because each propelling device 6 is positioned between the center of gravity and the center of aerodynamic forces. Therefore, the passengers do not experience any discomfort.

In maneuvers other than pure yawing (turning) and rolling, that is, in order to change the pitch of the airship, the elevators 5 are manipulated similarly to conventional aircraft.

While the vertical tails 4 are provided for stabilization, these could be used as rudders by making them rotatable within a horizontal plane, or a rudder could be provided separately from the tails. It is a matter of course that steering could be carried out by both these rudders and the propelling devices 6.

In the above-described embodiment, the horizontal airfoils 3 have a relatively large width in the front-rear direction (large chord) to maximize lift and exhibit sufficient mechanical strength. Further, if during flight the buoyancy of the airship and the weight thereof are balanced due to the lift provided by the horizontal airfoils 3, there exist merits such that the airship can descend quickly, and only a small amount of helium needs to be fed to and exhausted from the middle fuselage and the outer fuselages 2. However, there are also demerits in that the large airfoils 3 offer great resistance during vertical movement or rolling. Accordingly, in the case of an airship constructed for the purpose of offering flight experience, such as acrobatic flight, to passengers, the horizontal airfoils 3 should be narrow. The design size of the airfoils is thus selected dependent on the desired maneuverability of the airship in question.

In addition, for facilitating a quick change in the longitudinal direction of flight for the purpose of achieving a stable mooring, front and rear water ballast tanks which can be automatically filled with and drained of sea water, pond water or other water, and which can give and receive water to and from one another, can be provided at the lower central portion of the hull, for example, at the bottom of the cabin 14. Alternatively, these tanks could be disposed at the front and rear of the lower portion of the middle fuselage 1 in order to make the longitudinal moment as large as possible. These tanks thus serve to effect a weight-to-buoyancy of the airship on the ground.

For instance, in the case where it is desired to raise the front of the airship, if water is transferred from the front tank to the rear tank to shift the center of gravity to behind the position of the propellers 7 (the center of aerodynamic forces being already located to the rear of the propellers) and the propellers 7 are directed upwards, then both moments about the center of gravity and about the center of aerodynamic forces with respect to the line of lift (vertical line) are directed downwards and the hull assumes a front-raised state. In the case of lowering the front of the airship, operations reverse to the above-described operations are carried out.

When mooring the airship on the ground, both the front and rear tanks are filled with water. In order to feed and exhaust water to and from these tanks, feed/exhaust means, such as pumps, pipings, necessary valves, hoses, etc., could be equipped on the hull or else, a ground installation could be provided at the take-off and landing zone of the airship.

Alternatively, longitudinal control could be performed by providing propellers at two front and rear locations, making the pitches of the respective propellers opposite to each other, making the directions of the propellers opposite to each other or tilting the directions of the propellers in opposite manners to each other, and thereby adjusting the vertical component of force.

For instance, when the airship ascends, the location where the moment of the center of gravity and the moment of the center of aerodynamic forces with respect to the upward propelling line of the propellers 7 effectively offset each other depends upon the state of the airship. That is, the loaded weight of the airship changes, naturally the affect of forces acting on the airship changes; also, a moment about the center of gravity changes during flight because of the fact that the distance between vertical lines passing through the center of gravity and passing through the point at which an upward propelling force acts will typically change. If the vertical component of velocity changes, the affect of air resistance changes and the moment about the center of aerodynamic forces also changes. Consequently, the above-mentioned location would change, and hence, the airship might not always be able to maintain a horizontal attitude. In such cases, attitude control could be carried out by adjusting the above-described water-ballast or adjusting the directions or pitches of the front and rear propellers.

It is to be noted that the outer shells of the middle fuselage 1 and the outer fuselages 2 can be made of materials other than plastic fibers, and the outer plates of the horizontal airfoils 3 need not be made of high-strength aluminum but can be made of other light metallic materials or of an organic material.

As described above, according to this preferred embodiment, because the airship an be moved in every direction in three dimensions, and the yawing, pitching and rolling of the airship can be controlled, pin-point take-offs and landings can be performed extremely easily. Also, even if a cross-wind or the like exists, by directing the propeller 7 in a direction which will create a propelling force to offset the force of the cross-wind, landing and take-off can be carried out as if under calm conditions. Therefore, the airship has an advantage in that it can carry a large amount of men and cargo into and out of remote, narrow places, such as an island.

In addition, the airship can undergo acrobatic flight including maneuvers under an attitude and operations such as ascending, descending, side-slip, retreating, inverting, turning, spins. Accordingly, the airship can be used strictly for pleasure flights.

Furthermore, the airship according to the present invention is useful in rescue operations because it does not produce a strong downward wind such as that produced by a rotor of a helicopter. For instance, an exhausted sufferer can be calmly rescued while the airship hovers in the air.

Also, because the airship does not require a runway to take-off and land, it has an advantage in that it can replace the aircraft and helicopters transporting men and goods between remote places, between towns and remote places, or between islands.

Accordingly, in a mountainous country or on an island country, where there is little flat land, where wide roads cannot be constructed, where a long runway cannot be constructed, and where short travel routes cannot be constructed due to the existence of a channel or a bay, the airship according to the present invention is quite useful in transporting information, food and personnel.

While a principle of the present invention has been described above in connection with one preferred embodiment of the invention, it is intended that all matter contained in the above description be interpreted as illustrative of the invention and not in a limiting sense.

What is claimed is:

1. An omnidirectional airship comprising: a hull including a middle fuselage, outer fuselages disposed to respective sides of and spaced from said middle fuselage, and a cabin, said fuselages constituting an airtight gas chamber, said middle fuselage having a tear drop shape tapering in the aft direction of the airship, and each of said outer fuselages having a tear drop shape similar to and smaller than that of said middle fuselage; gas lighter than air occupying said gas chamber; an airfoil connected to said hull; propelling means for propelling the airship; gimbals supporting said propelling means; all of said propelling means being disposed proximately midway, in the forward to aft direction of the airship, between the center of gravity of said hull and the aerodynamic center of the airship; said airfoil comprising right and left horizontal airfoils connecting the middle fuselage to the outer fuselages; and vertically extending tails and elevators provided at rear portions of the horizontal airfoils.

2. An omnidirectional airship comprising: a middle fuselage; outer fuselages disposed to respective sides of and spaced from said middle fuselage, said fuselages constituting an airtight gas member; a gas lighter than air occupying said gas chamber; a cabin; a delta-shaped airfoil connecting said middle fuselage to said outer fuselages; only two propelling means for propelling the airship; and two gimbals mounted to the airfoil on opposite sides of said middle fuselage, respectively, and supporting said two propelling means, respectively.

3. An omnidirectional airship as claimed in claim 2, wherein said propelling means are located between, in the forward to aft direction of the airship, the center of gravity of the airship and the aerodynamic center of the airship.

* * * * *